United States Patent
Dai et al.

(10) Patent No.: US 7,848,199 B2
(45) Date of Patent: Dec. 7, 2010

(54) SPINDLE MOTOR CONTROLLING METHOD AND OPTICAL DISK DRIVE USING THE SAME

(75) Inventors: Lung Dai, Taipei Hsien (TW); Kun Huang, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

(*) Notice: Subject to any disclaimer, the term of this patent is extended or adjusted under 35 U.S.C. 154(b) by 236 days.

(21) Appl. No.: 12/325,274

(22) Filed: Dec. 1, 2008

(65) Prior Publication Data

US 2009/0183189 A1 Jul. 16, 2009

(30) Foreign Application Priority Data

Jan. 14, 2008 (CN) ......................... 2008 1 0300085

(51) Int. Cl.
G11B 7/00 (2006.01)
(52) U.S. Cl. ..................... 369/53.3; 369/47.38
(58) Field of Classification Search ................ None
See application file for complete search history.

(56) References Cited

U.S. PATENT DOCUMENTS

| | | | | |
|---|---|---|---|---|
| 5,270,992 A | * | 12/1993 | Yasuda et al. | 369/53.43 |
| 5,602,805 A | * | 2/1997 | Chigita | 369/13.02 |
| 5,774,292 A | * | 6/1998 | Georgiou et al. | 360/73.03 |
| RE36,590 E | * | 2/2000 | Yanagi | 369/30.17 |
| 6,088,315 A | * | 7/2000 | Ando | 369/47.41 |
| 6,603,719 B1 | * | 8/2003 | Wu | 369/47.33 |
| 6,839,309 B1 | * | 1/2005 | Yunoki et al. | 369/47.33 |
| 6,876,606 B2 | * | 4/2005 | Kajino et al. | 369/44.27 |
| 2003/0198157 A1 | * | 10/2003 | Smith | 369/53.3 |
| 2006/0083134 A1 | * | 4/2006 | Matsuno et al. | 369/47.29 |
| 2007/0070836 A1 | * | 3/2007 | Kitagawa | 369/44.11 |

* cited by examiner

*Primary Examiner*—Peter Vincent Agustin
(74) *Attorney, Agent, or Firm*—Frank R. Niranjan

(57) ABSTRACT

An optical disk drive includes a spindle motor, a power source, a microprocessor, and a comparator. The spindle motor is for supporting a disk. The power source supplies a first voltage to drive the spindle motor to rotate. The microprocessor signals the power source to supply a second voltage to slow down rotational speed of the spindle motor when receiving a power-off signal. The comparator compares the rotational speed with a predetermined value. The microprocessor signals the power source to stop supplying power to the spindle motor when the rotational speed is smaller than the predetermined value. A controlling method for controlling the spindle motor in the optical disk driver is also provided.

9 Claims, 2 Drawing Sheets

SPINDLE MOTOR CONTROLLING METHOD AND OPTICAL DISK DRIVE USING THE SAME

BACKGROUND

1. Field of the Invention

The present invention generally relates to optical disk drives, and more particularly relates to an optical disk drive using a controlling method for controlling operation of a spindle motor of the optical disk drive.

2. Description of related art

Currently, controlling operation of a spindle motor in an optical disk drive always includes the following steps: rotating a disk by the spindle motor; receiving controlling signals via an input unit; controlling the operation of the spindle motor according to the controlling signals by a control unit.

When one needs to insert and/or remove (or swap) a disk from an optical disk drive the following events may occur: receiving a power-off signal via the input unit; signaling a power source to discontinue supplying power to the spindle motor. When the spindle motor is powered off, the spindle motor slowly decelerates and comes to a complete stop after a period of time. Only after the spindle motor comes to a complete stop that the disk can be safely inserted/removed from disk drive without risking damage. However, the period of time for the motor to come to a complete stop is time consuming, and, as a result, one wastes too much time waiting for the motor to come to a complete stop before swapping or removing the disk with or without another one.

Therefore, controlling method for a spindle motor is needed in the industry to address the aforementioned deficiency.

DETAILED DESCRIPTION

Figure 1:
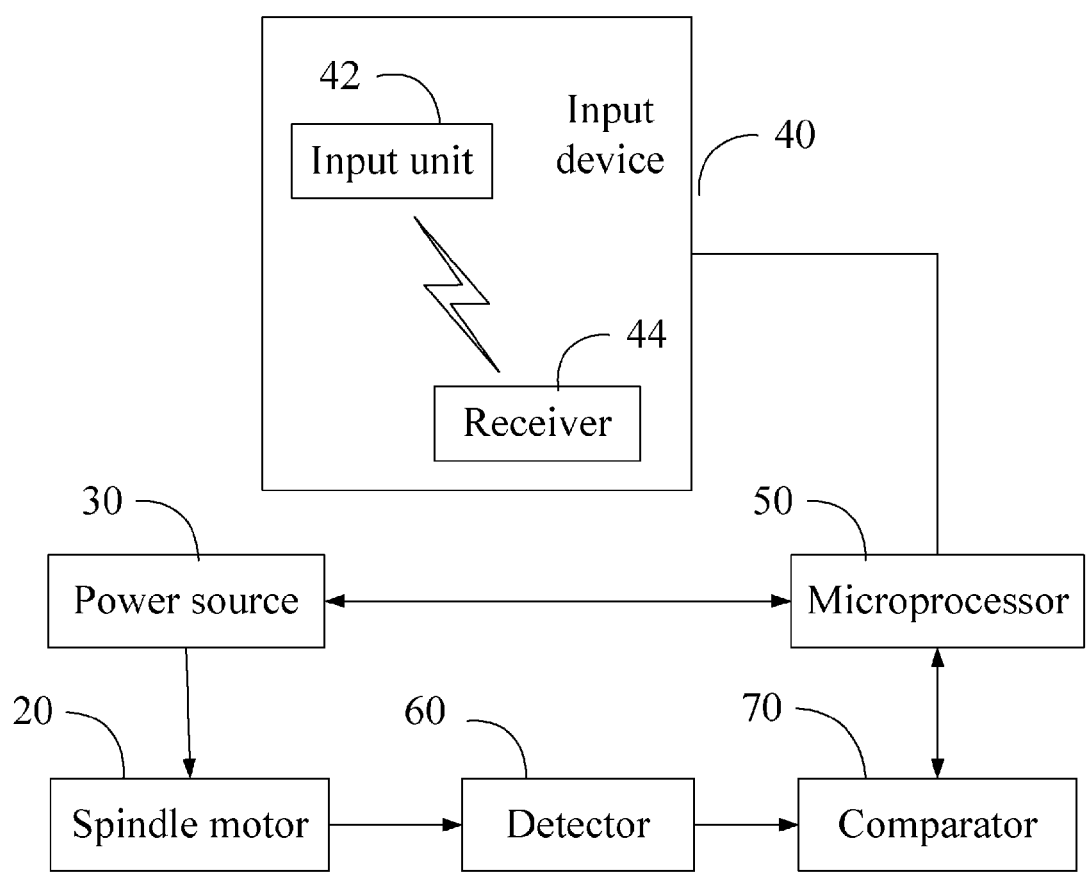
FIG. 1 is a schematic block diagram showing an optical disk drive in accordance with an exemplary embodiment.

Referring to FIG. 1, an optical disk drive 100 in accordance with an exemplary embodiment includes a spindle motor 20, a power source 30, an input device 40, a microprocessor 50, a detector 60, and a comparator 70. The spindle motor 20, the power source 30, the microprocessor 50, the detector 60, and the comparator 70 are electrically connected together. The input device 40 is electrically connected to the microprocessor 50.

The spindle motor 20 supports a disk (not shown) and rotates the disk in order for other components to write or read information from the disk. The power source 30 supplies a first voltage to drive the spindle motor 20 to rotate. The input device 40 responds to operations and generates input signals. The microprocessor 50 scans the input signals for a power-off signal. If the power-off signal is not detected, the microprocessor 50 will continue to scan another group of input signals.

If the power-off signal is detected, the microprocessor 50 generates a slowing signal to the power source 30. In response to the slowing signal, the power source 30 supplies a second voltage that slows down a rotational speed of the spindle motor 20. The second voltage starts from zero volts and the voltage is gradually increased with a polarity opposite to that of the first voltage, thus no abrupt change in speed of the spindle is realized and the spindle is allowed to slow down smoothly. The detector 60 detects the rotational speed of the spindle motor 20. The comparator 70 compares the rotational speed with a predetermined value stored in the optical disk drive 100. If the rotational speed is larger than or equal to the predetermined value, the power source 30 continues supplying the second voltage to slow down the rotational speed.

If the rotational speed of the spindle motor 20 is smaller than the predetermined value, the microprocessor 50 signals the power source 30 to stop supplying power to the spindle motor 20. If the predetermined value is set quite small, the spindle motor 20 rotates at a very low speed when the spindle motor 20 is powered off. Therefore, operators don't need to wait too long.

In the embodiment, the input device 40 includes an input unit 42 and a receiver 44. The input unit 42 generates the input signals in response to an operators' input, and then sends the input signals to the receiver 44 wirelessly. In other embodiment, the input device 40 may be directly assembled on the optical disk drive 100 as a button.

Figure 2:
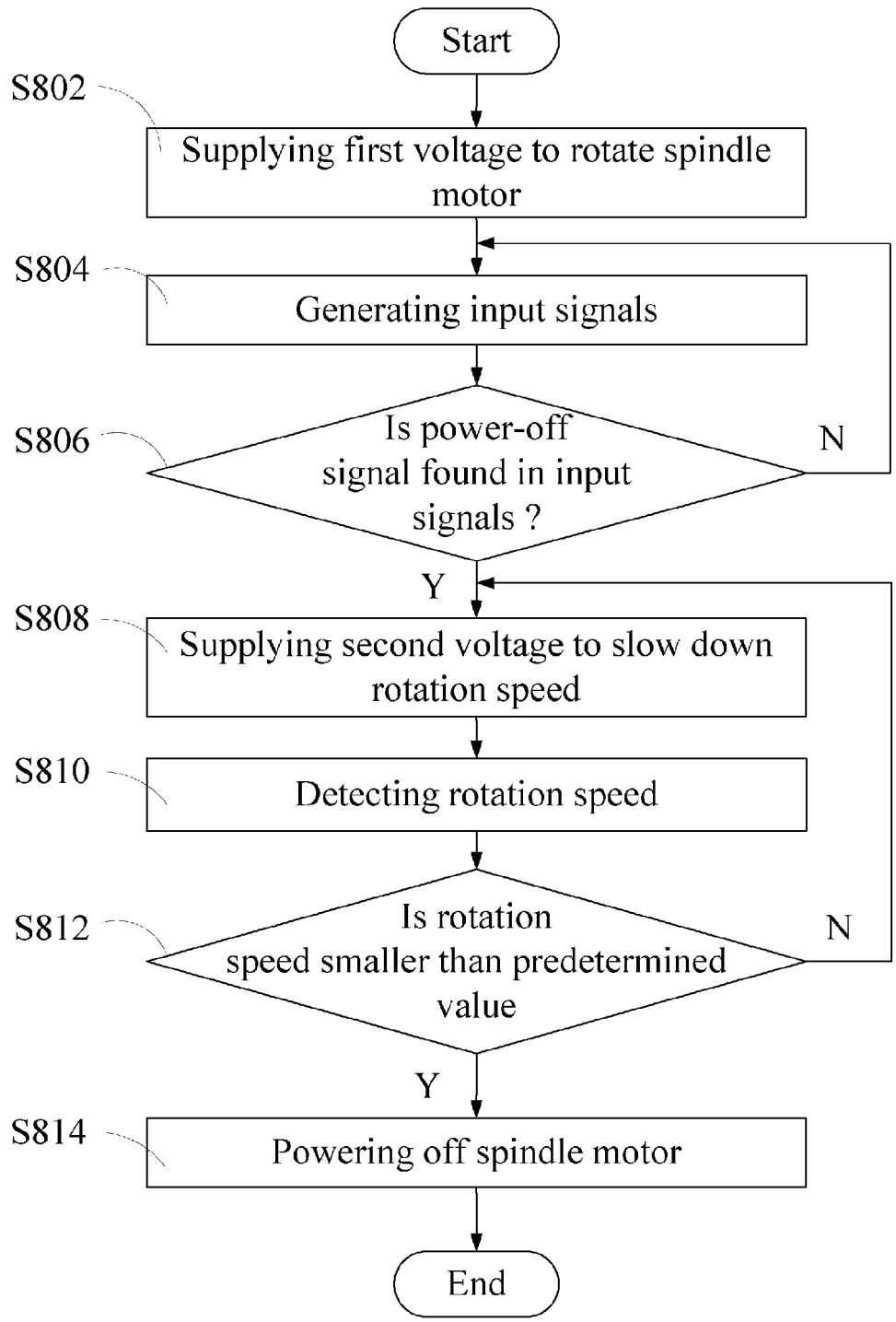
FIG. 2 is a flow chart showing a controlling method for controlling the spindle motor.

Referring to FIG. 2, a procedure of a controlling method in accordance with an exemplary embodiment is used for controlling the spindle motor 20. The procedure includes the following steps.

In step S802, a first voltage is supplied to rotate the spindle motor 20.

In step S804, input signals are generated by the input device 40.

In step S806, the input signals are scanned for a power-off signal by the microprocessor 50. If the power-off signal is not found, the procedure goes to step S804. If the power-off signal is found, the procedure goes to step S808.

In step S808, a second voltage is supplied to slow down rotational speed of the spindle motor 20.

In step S810, the rotational speed of the spindle motor 20 is detected by the detector 60.

In step S812, the rotational speed is compared with a predetermined value by the comparator 70. If the rotational speed is larger than or equal to the predetermined value, the procedure goes to step S808. If the rotational speed is smaller than the predetermined value, the procedure goes to step S814.

In step S814, the spindle motor 20 is powered off.

It is to be understood that the above description and the following claims drawn to a method may include some indication in reference to certain steps. However, the indication used is only to be viewed for identification purposes and not as a suggestion as to an order for the steps.

It is also to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An optical disk drive comprising:
    a spindle motor for supporting a disk;
    a power source supplying a first voltage to drive the spindle motor to rotate;
    a microprocessor signaling the power source to supply a second voltage to slow down rotational speed of the spindle motor when receiving a power-off signal; and
    a comparator comparing the rotational speed with a predetermined value;

wherein the microprocessor signals the power source to stop supplying power to the spindle motor when the rotational speed is smaller than the predetermined value.

2. The optical disk drive according to claim 1, further comprising an input device generating input signals.

3. The optical disk drive according to claim 2, wherein the microprocessor scans the input signals for the power-off signal.

4. The optical disk drive according to claim 2, wherein the input device comprises an input unit generating the input signals and a receiver receiving the input signals from the input unit wirelessly.

5. The optical disk drive according to claim 1, further comprising a detector detecting the rotational speed of the spindle motor.

6. A controlling method for controlling a spindle motor in an optical disk driver, the controlling method comprising:
   (a) supplying a first voltage to rotate the spindle motor;
   (b) receiving a power-off signal;
   (c) supplying a second voltage to slow down rotational speed of the spindle motor; and
   (d) powering off the spindle motor when the rotational speed is smaller than a predetermined value.

7. The controlling method according to claim 6, further comprising:
   (e) generating input signals;
   (f) scanning the input signals for the power-off signal.

8. The controlling method according to claim 6, further comprising:
   (g) detecting the rotational speed.

9. The controlling method according to claim 6, further comprising:
   (h) comparing the rotational speed with the predetermined value;
   (i) going to step (c) if the rotational speed is larger than or equal to the predetermined value.

* * * * *